United States Patent
Tatham et al.

(10) Patent No.: US 6,223,177 B1
(45) Date of Patent: Apr. 24, 2001

(54) NETWORK BASED GROUPWARE SYSTEM

(75) Inventors: Charles Edward Tatham, Toronto; Randall Nelson Remme, Bolton; Gerald William Smith, Newmarket, all of (CA)

(73) Assignee: Involv International Corporation, St. Michael's (BB)

( * ) Notice: Subject to any disclaimer, the term of this patent is extended or adjusted under 35 U.S.C. 154(b) by 0 days.

(21) Appl. No.: 09/195,905

(22) Filed: Nov. 19, 1998

Related U.S. Application Data

(63) Continuation-in-part of application No. 08/955,569, filed on Oct. 22, 1997.

(30) Foreign Application Priority Data

Nov. 19, 1997 (CA) .................................. 2221790

(51) Int. Cl.[7] ...................................... G06F 17/30
(52) U.S. Cl. .................... 707/9; 707/9; 707/10; 709/225; 713/200; 713/202; 345/331
(58) Field of Search ................. 707/10, 9, 100, 707/200, 1, 2, 5, 102, 104, 203, 205; 705/8; 709/203–206, 217–219, 223, 225; 713/202, 200, 201; 345/330, 329, 331; 711/159

(56) References Cited

U.S. PATENT DOCUMENTS

| | | | |
|---|---|---|---|
| 5,208,912 * | 5/1993 | Nakayama et al. .................. 709/203 |
| 5,333,152 * | 7/1994 | Wilber ............................. 379/102.04 |
| 5,392,400 * | 2/1995 | Berkowitz et al. ................. 709/203 |
| 5,432,934 * | 7/1995 | Levin et al. ......................... 713/200 |
| 5,548,506 * | 8/1996 | Srinivasan ............................. 705/8 |
| 5,555,375 * | 9/1996 | Sudama et al. ..................... 709/226 |
| 5,557,726 * | 9/1996 | Yoshizawa .......................... 345/330 |
| 5,572,643 * | 11/1996 | Judson ............................... 709/218 |
| 5,581,702 * | 12/1996 | McArdle et al. .................... 709/204 |
| 5,606,693 * | 2/1997 | Nilsen et al. ......................... 707/10 |
| 5,781,909 * | 7/1998 | Logan et al. ........................ 707/200 |
| 5,790,785 * | 8/1998 | Klug et al. .......................... 713/202 |
| 5,790,790 * | 8/1998 | Smith et al. ........................ 709/206 |
| 5,793,972 * | 8/1998 | Shane ................................. 709/219 |
| 5,809,242 * | 9/1998 | Shaw et al. ......................... 709/217 |

(List continued on next page.)

FOREIGN PATENT DOCUMENTS 0 616 448 A2 * 9/1994 (EP) ................................. 707/100

OTHER PUBLICATIONS

Backer, Andreas et al., "DocMan: A Document Management System for Cooperation Support," Proceedings of the Twenty–Ninth Hawaii International Conference on System Science, Jan. 3–6, 1996, vol. 3, pp. 82–91.*

Hiltunen, Matti et al., "Access Control in Wide–Area Networks," Proceedings of the 17th International Conference on Distributed Computing Systems, May 27–30, 1997, pp. 330–337.*

Yavatkar, Rajendra et al., "Clique: A Toolkit for Group Communication using IP Multicast," Proceedings of the First International Workgroup on Service in Distributed and Networkd Environments, Jun. 27–28, 1994, pp. 132–138.*

*Primary Examiner*—Hosain T. Alam
*Assistant Examiner*—Shahid Alam
(74) *Attorney, Agent, or Firm*—Kevin Pillay; Fasken Martineau Dumoulin LLP

(57) ABSTRACT

The present invention relates to a system for providing a communication network, comprising: an intranet-connected server having input and access capabilities; a means on the server for receiving instructions input from a first user and for creating a dedicated intranet site based on the received instructions; means to communicate existence of the dedicated intranet site to a nominated second user; means to access contents of the dedicated intranet site by the second user via a web-browser installed on the second user; and means to store information in the dedicated intranet site input via a web-browser installed at the first or the second user.

15 Claims, 8 Drawing Sheets

U.S. PATENT DOCUMENTS

| | | | |
|---|---|---|---|
| 5,815,657 | * 9/1998 | Williams et al. | 713/200 |
| 5,826,265 | * 10/1998 | Van Huben et al. | 707/8 |
| 5,892,905 | * 4/1999 | Brandt et al. | 713/201 |
| 5,987,140 | * 11/1999 | Rowney et al. | 705/79 |
| 6,052,785 | * 4/2000 | Lin et al. | 713/201 |
| 6,085,192 | * 7/2000 | Mendez et al. | 707/10 |
| 6,085,324 | * 7/2000 | Ogram | 713/202 |
| 6,115,709 | * 9/2000 | Gilmour et al. | 707/9 |

* cited by examiner

NETWORK BASED GROUPWARE SYSTEM

This is a Continuation-in-Part application based on Application No. 08/955,569 filed Oct. 22, 1997.

The present invention relates to the field of collaborative software systems. More specifically, the invention relates to a system and method for providing intranet-based groupware functionality.

BACKGROUND OF THE INVENTION

Recently, the need for collaborative computing environments has been receiving increasing attention. People are finding that it is more and more important to share information and work together to meet common goals. With increasing specialization in the marketplace, there is frequent need to work together with people from different offices, different organizations and even different countries to satisfy the requirements of a particular project or goal. Managing collaborative initiatives of this type is not a simple matter.

Electronic network based, project management server systems are known. For example, U.S. Pat. No. 5,548,506 [Srinivasan] discloses an automated, electronic network based, project management server system for managing multiple work groups. The system comprises a core piece of software which runs on a host server computer system and interacts with a messaging system such as E-mail or facsimile. The system compiles multi-project plans into a multi-project database and tracks the ownership of projects, tasks and resources within the plans. The system automatically checks all resource requests and if resource availability limits are exceeded then resources are allocated on projects based on priorities and project plans are changed accordingly. The system is also programmed to send out reminders and follow-ups and the databases are continuously updated on status changes reported by work group members.

One of the disadvantages of known electronic network-based, collaborative server systems is that they depend on Information Technology specialists or a system administrator to administer control of the system, i.e., if a user wishes to add functionality to a system, they must have access to the program itself. Further, many collaborative systems require each user to have specialized software installed on their computer.

It is an object of the present invention to obviate and mitigate at least one of the disadvantages of the prior art.

SUMMARY OF THE INVENTION

Accordingly, in one of its aspects, the present invention provides a system for providing a communication system, the system comprising:
(i) a host computer having input and access capabilities;
(ii) a means on the server for receiving instructions input from a first user and for creating a dedicated intranet site based on the received instructions;
(iii) means for communicating existence of the dedicated intranet site to a nominated second user;
(iv) means for accessing contents of the dedicated intranet site by the second user via a web-browser installed on the second user; and
(v) means for storing information in the dedicated intranet site input via a web-browser installed at the first or the second user.

In another aspect the present invention provides a system to provide a team of users with intranet-based groupware functionality, comprising:

(i) an intranet-connected server having a means for receiving an initiate instruction from a primary user;
(ii) a means for creating a dedicated site on the server in response to the initiate instruction;
(iii) means for sending information about the existence of the site to at least one secondary user nominated by the primary user;
(iv) means to receive information at the dedicated site sent by the at least one secondary user using a web browser;
(v) means to store information at the dedicated site at the request of the primary and the at least one secondary user;
(vi) means to permit processing of the information stored at the dedicated site by the primary and the at least one secondary user; and
(vii) means to download stored and processed information to the primary user and the at least one secondary user for display via a web browser.

In yet another aspect, the present invention provides a method for providing a communication network, comprising:
(i) providing an intranet-connected server having upload and download capabilities;
(ii) receiving instructions uploaded from a first user and for creating a dedicated intranet site on the server, the dedicated intranet site having a unique name based on the received instructions;
(iii) communicating the existence of the dedicated intranet site to a nominated second user;
(iv) downloading contents of the dedicated intranet site to the second user via a web-browser installed at the second user;
(v) storing information in the dedicated web-site uploaded via a web-browser installed at the first or the second user.

In yet another aspect, the present invention provides a computer configured to operate a groupware application program, the computer comprising:
(i) means to connect to at least a primary and a secondary user;
(ii) means to receive instructions input from the primary user;
(iii) means to create a dedicated site within the computer based on the instructions input from the primary user;
(iv) means to loop up address of secondary user from an address database;
(v) means to communicate existence of the dedicated site to the secondary user;
(vi) means to store information at the dedicated site at the request of the primary and the secondary user; and
(vii) means to process the stored information at the request of the primary and the secondary user.

In yet another aspect, the present invention provides a data carrier having thereon a computer program for performing the steps of:
(i) facilitating communication between a server, a primary user and a secondary user;
(ii) creating a dedicated site within the server based on instructions input from the primary user;
(iii) looking up address of the secondary user from an address database;
(iv) communicating the existence of the dedicated site to the secondary user;

(v) storing information at the dedicated site at the request of the primary and the secondary user; and (vi) processing the stored information at the request of the primary and the secondary user.

BRIEF DESCRIPTION OF THE DRAWINGS

An embodiment of the present invention will be described, by way of example only, with reference to the accompanying drawings, in which.

DETAILED DESCRIPTION OF THE PREFERRED EMBODIMENT

Figure 1:
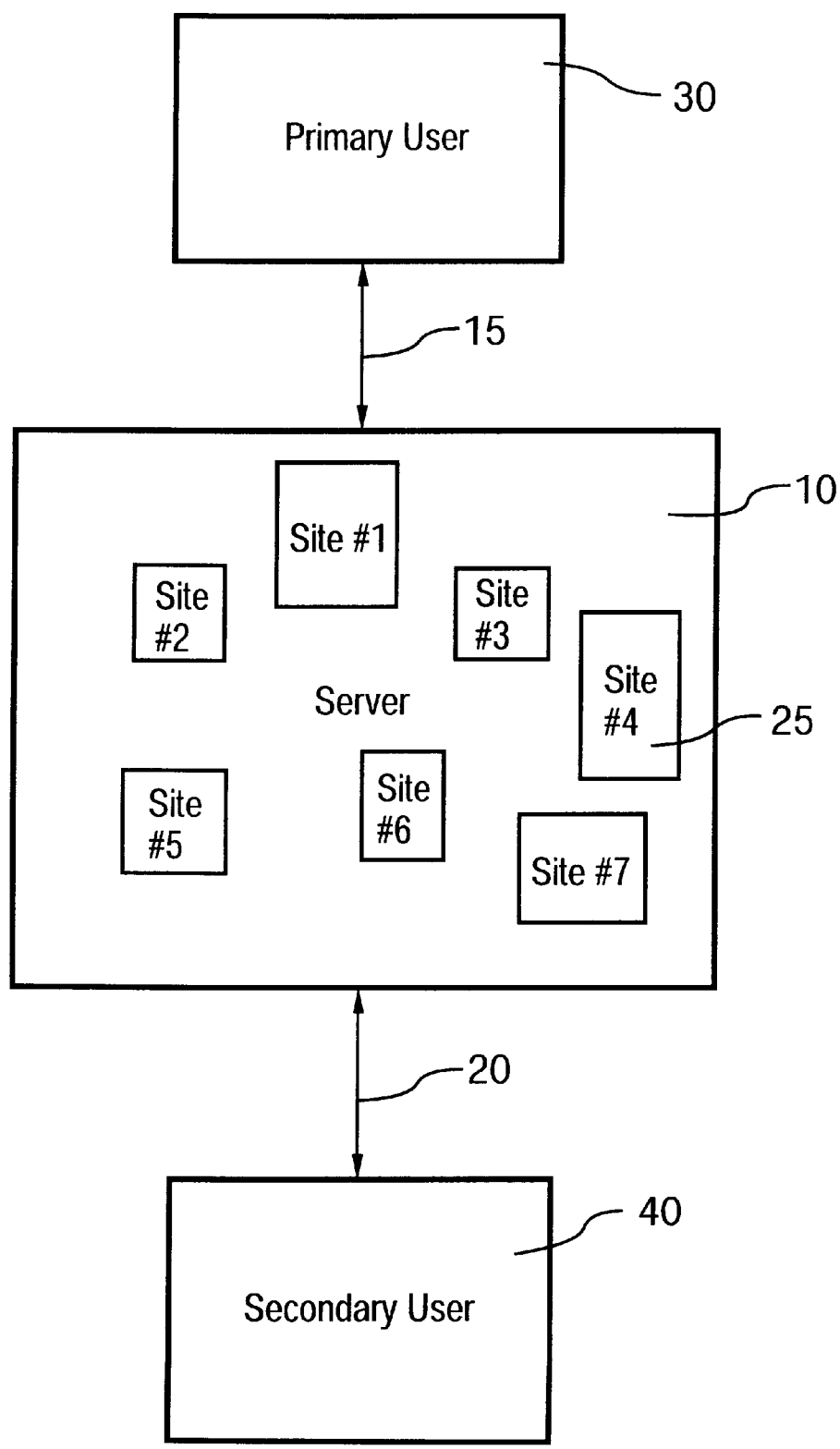
FIG. 1 is a schematic representation of a system in accordance with one embodiment of the present invention.

A system to provide a team of users with intranet-based groupware functionality in accordance with an embodiment of the present invention is shown schematically in FIG. 1.

The system generally comprises at least one server computer as an intranet connected server 10 which supports a TCP/LP protocol and which has input and access capabilities via two-way communication lines, such as communication lines 15 and 20. The computer is configured as a web server. Server 10 has a unique resource locator (URL) address and comprises a means to create a dedicated intranet site 25 (e.g. Site#4) on the server in response to an initiate request received from a primary user 30. Dedicated site 25 has a unique address which identifies it with the primary user 30 (e.g., #4) within server 10. Server 10 further comprises a means to send information, including its URL address and the unique address of the dedicated site, to at least one secondary user 40, nominated by the primary user 30.

Both primary user 30 and secondary user 40 can communicate with server 10 by means of an HTML compliant client supporting a graphical user interface and internet browser, such as Netscape Navigator or Microsoft Explorer, i.e., there is no requirement that either primary user 30 or secondary user 40 have access to specialized software applications in order to utilize the system of the present invention. Information on the site 25 is credited as a hypertext document and is thus displayed as a web page on the GVI of the user's web browser, with a link to this hypertext document.

Once connected to dedicated site 25 created on server 10, primary user 30 and secondary user 40 both have access to at least some of the information stored at the site, the ability to access and process at least some of the information and the ability to input and store processed and/or new information. All the specialized software which provides the functional requirements to give primary user 30 and secondary user 40 these abilities is provided by server 10 via dedicated site 25. Once again, primary user 30 and secondary user 40 do not require any specialized software applications other than a standard internet browser.

Server 10 may be provided a number of general sites (e.g., Sites #1, #2, #3) which are automatically accessible to primary user 30 and secondary user 40; other sites (e.g., Site #6) which are accessible to only one of the users; and some sites (e.g., Site #7) which can only be accessed by a system administrator (not shown). The nature and purpose of these different sites will be describe in more detail below.

It will be apparent that although the system of the present invention is primarily intranet-based, the nature of communication lines, such as line 15 between server 10 and primary user 30, is not particularly limited. An intranet is simply defined by its security parameters for the connected users. Suitable intranet-adaptable communication lines include dedicated liens, public telephone networks, private telephone networks, satellite links, Ethernet links, etc. These communication lines are already in place if primary user 30 and secondary user 40 have existing intranet access.

It is envisioned that server 10 may be connected to the internet as well as an intranet. A suitable firewall (not shown) may be provided between the intranet and external or intranet users. As will also be apparent in this embodiment, the geographic locations of primary user 30, secondary user 40 and server 10 are only limited by internet accessibility, i.e., all three need not be in the same city, county or even continent.

The dedicated site created in response to the initiate request can be thought of as being a private office suite within the semi-public intranet.

The private office suite may be created on the server for a period of time desired by the primary user, after which time the private suite can be erased to free-up system resources. The private office suite comes complete with all the application software required to permit group activity within the office. The primary user can construct a private office suite to include the specific applications desired. Thus, an advantage of the present system is that the user is provided with a customizable, secure office suite in which the user and his/her team members can access applications software without the need for each team member to have individual copies of each applications software.

The system of the present invention is "end-user friendly", i.e., neither primary user 30 nor secondary user 40 need specialist computer knowledge to make use of the system. There is no requirement for the primary user to have an in-house Information Technology specialist.

Figure 2A:
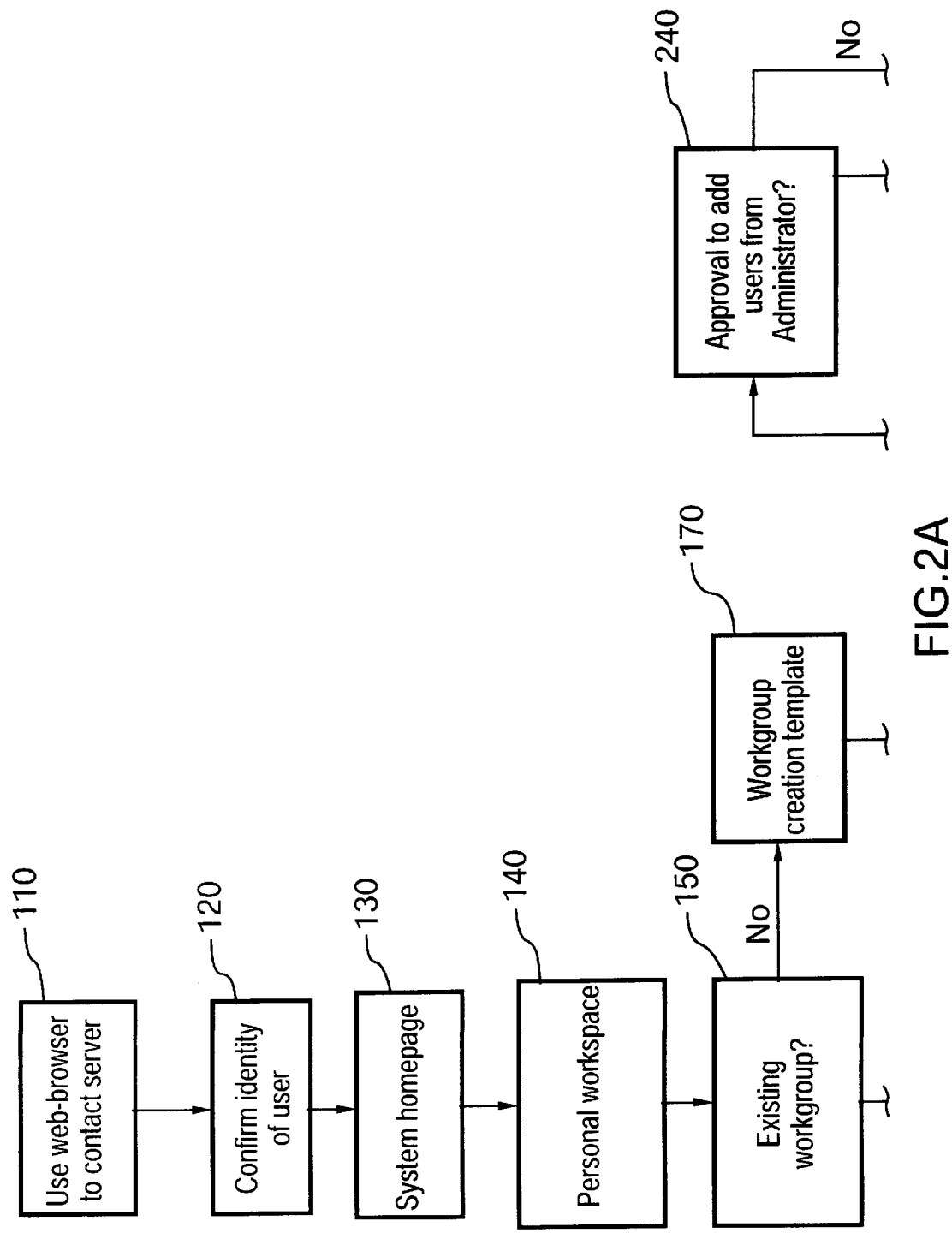
FIG. 2 is a flowchart outlining the operation of the system.
Figure 2B:
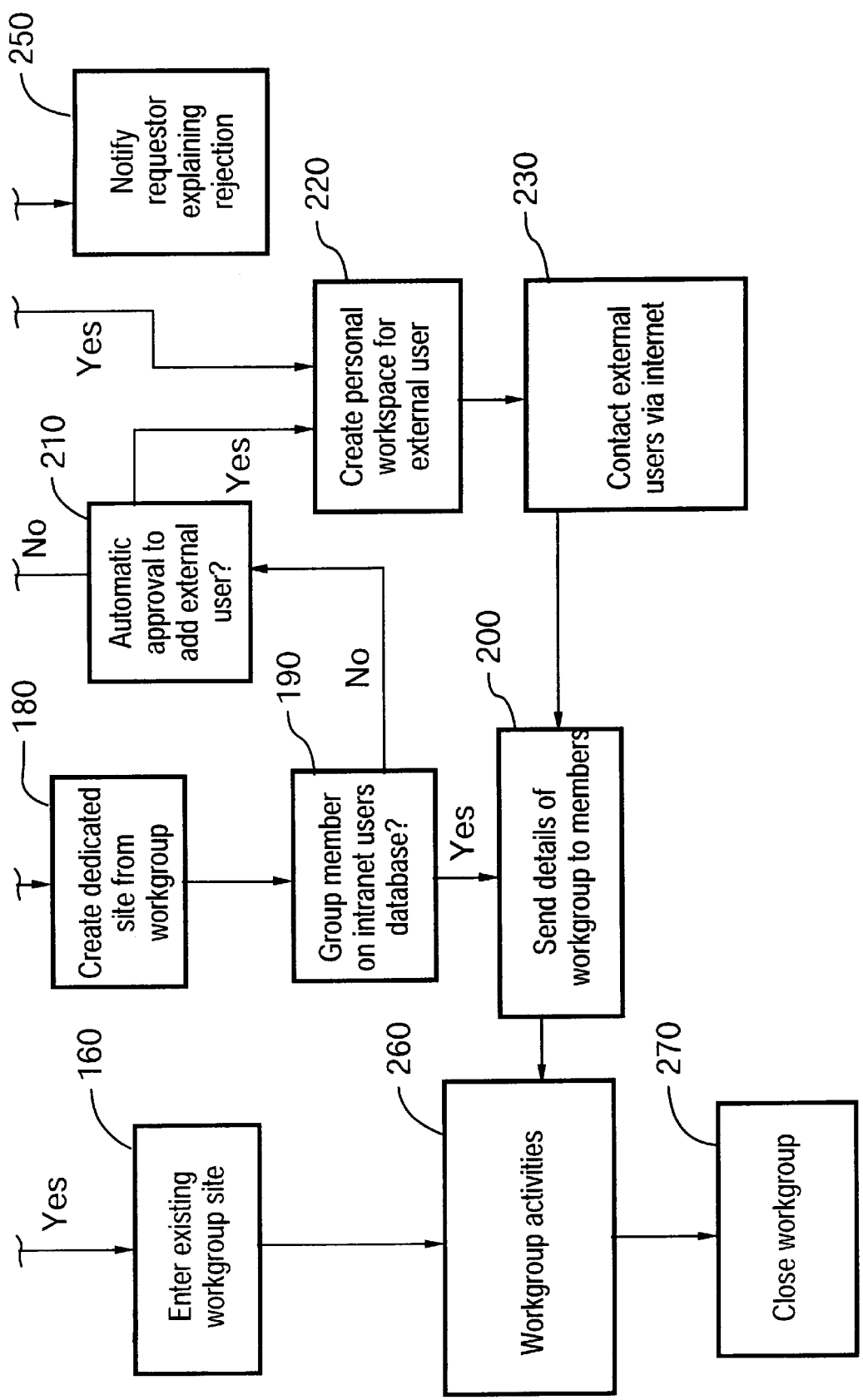

The system of the present invention is further understood when described by its mode of operation and with reference to FIG. 2.

In order to create a private office suite, a primary user uses his/her web browser 110 to contact the intranet connected server. The server confirms the identity 120 of the primary user and directs the primary user to the system homepage 130. From the system homepage, the primary user can access his/her personal workspace 140.

Among other options which will be discussed below, the primary user has the option to enter an existing workgroup with a pre-defined dedicated site or to create a new workgroup with a new, unique dedicated site (150).

If the primary user wishes to enter an existing workgroup the server permits access to the pre-defined site (160).

If the primary user wishes to create a new workgroup, he/she is provided with a workgroup creation template (170) which permits the primary user to define parameters of the workgroup, such as the name of the workgroup and the site to be created, the scope of the project being undertaken, the number of team members, etc.

During completion of the template, the primary user is prompted to identify the number and contact addresses of the group members, the types of user applications which are to be utilized during the project and to provide a name for the dedicated site to be created.

Once this template has been completed, the server creates a dedicated site (180) having the name chosen by primary user. The administration sub-system checks to see whether all the prospective group members identified by the primary user are listed on the existing intranet-user database (190). If a prospective group member is an existing intranet user, the server then sends details of the newly created dedicated site to that member of the group (secondary user) (200). In a presently preferred embodiment, the server automatically creates a link between each secondary user's personal workspace and the newly created dedicated site. Alternatively, the details of the web-site may be sent in the form of an E-mail message which provides each secondary user with the address of the dedicated site, an invitation to join the workgroup and, if applicable, the password required for gaining access to the site (see later).

If a prospective group member is not an existing intranet user, the administration sub-system determines whether the primary user has the authority to add external users (210). If the primary user does have authority to add external users, the server creates a personal workspace for that user (220) and notifies the external user of the existence of the workgroup (230). Preferably, the notification is done by means of E-mail, although other means, such as facsimile or pager, may also be used. Once authorized, an external user can contact the server via the internet and the external user has access to the same operational functionality as an intranet-connected user.

If the primary user does not have authority to add external users, a request is sent to a designated system administrator who makes the determination whether the external user can be added to the new workgroup (240). If approval is given, the system creates a personal workspace for the external user as before (220), if the addition of the external user is not approved, the primary user (requestor) is advised (250).

Once the approved secondary users have been notified of the existence of the dedicated site, the workgroup remains operational until all workgroup activities have been completed (260). When the primary user decides that there is no longer a requirement for the workgroup, the workgroup is closed (270) and the dedicated site may be deleted from the server. Prior to closure and deletion of the dedicated site, primary user may be given the option of downloading and storing all the data from the site for archive purposes.

During the creation of a dedicated site, secondary user nomination, workgroup activity, closure of the workgroup and eventual deletion of the site, all the administrative details of the workgroup activity are automatically fed into the administrative sub-system for processing. The administration sub-system controls all the day to day management of the system. It contains all the code and script required for workgroup size monitoring and database size monitoring. Further, the administration sub-system is responsible for monitoring server traffic and hit counts and the control of the offering of additional subscriber applications.

Security is an important feature of most business activity and the system of the present invention provides many levels of security which can be selected by the primary user and/or system administrator to suit his/her individual needs. For example, a basic form of security is to provide the dedicated site created with a password which must be entered by both the primary user and the secondary users to gain access to the workgroup. This password may be the same for the primary user and all the secondary users or every secondary user may be provided with a unique password. Providing each secondary user with a unique password also permits primary user to set up different levels of information which can be accessed within the workgroup by each secondary user, i.e., the workgroup can be created on a "need to know" basis. Examples of other security features include the ability of the primary user to decide: who has the authority to add new secondary users to and/or delete existing secondary users from the group after its creation; who has access to the administrative records of the workgroup; and when and if passwords and/or security levels are to be changed.

As will be apparent, there are many different types of workgroup activities which can be performed on a system in accordance with the present invention. In fact, it is envisioned that the present system could be adapted to perform many of the tasks of conventional LAN- or WAN-based group collaboration systems. Preferred workgroup activity applications of the present system include bulletin board, chat room, calendar, contact database, change control, event planner, group discussion, issue management, project collaboration, presentation library, decision survey in a box, NGS proposal development, document manager, and You Own Custom Application.

A bulletin board is a common place for team members to post anything that might be of interest to the team. Discussion, file attachments, and broadcast main are available. Additionally, a number of views may be utilized to gain access to the information, including by date, by author, by type, etc.

A chat room is a real-time chat function for teams to schedule discussions on the fly.

A calendar is a central calendar dedicated to the team, where individuals may add entries to keep track of milestones, issues and events. It is presented in a dynamic view, i.e. 2day, one week, two weeks or one month.

A contact database is an application that allows groups to track specific contracts in a central place. The views allow sorting by name, company type, etc.

A change control is a workflow application that allows teams to request and manage project changes.

An event planner is an application that is targeted at managing the deliverables for an upcoming event. Team members can assign tasks and milestones, broadcast mail to the stakeholders, and view a calendar in a number of formats.

The group discussion is a complete collaborative application that offers groups a central meeting place for the exchange of ideas.

Issue management is a workflow application that allows project teams to report issues, notify the owners, and track the resolution.

Project collaboration is a complete project management tool that provides managers and team members a Web sit environment for creating, implementing and managing projects. Involv Project Collaboration also imports and exports Microsoft Project Plans.

Presentation Library is an application similar to document management but specific to storing presentation files for sales and marketing use. File attachments, descriptions and a variety of views make accessing information easier.

The Decision Survey in a Box is a survey application created by Emerging Technology Solutions for Involv Intranet, Decision Survey allows for instant creation of surveys for publishing and gathering data from groups on the Intranet or extranet.

NGS Proposal Development is a workflow application created by Nexgen Solutions for Involv Intranet. This application allows all stakeholders in the proposal development process to come together with content quickly and effectively.

Document Manager is a central depository for posting and managing files and documents of all types. Check in/Check out and decision history makes this a powerful team tool.

Your Own Custom Application is a Domino application that can be offered through the Involv Intranet Desktop for self-service.

An embodiment of the system of the present invention is shown in FIGS. 3a–3e. All the display screens of the system exemplified in FIGS. 3a–3e have the appearance of a personal organiser, with an index "page" (300) on the left-hand side and a details "page" (310) on the right-hand side. The index page is tabbed (320a–320d) for convenient organisation and ease of use. As will be apparent, the style of screen display is not limited to this personal organiser style of display. Screen displays can be customized to a user's preference.

Figure 3A:
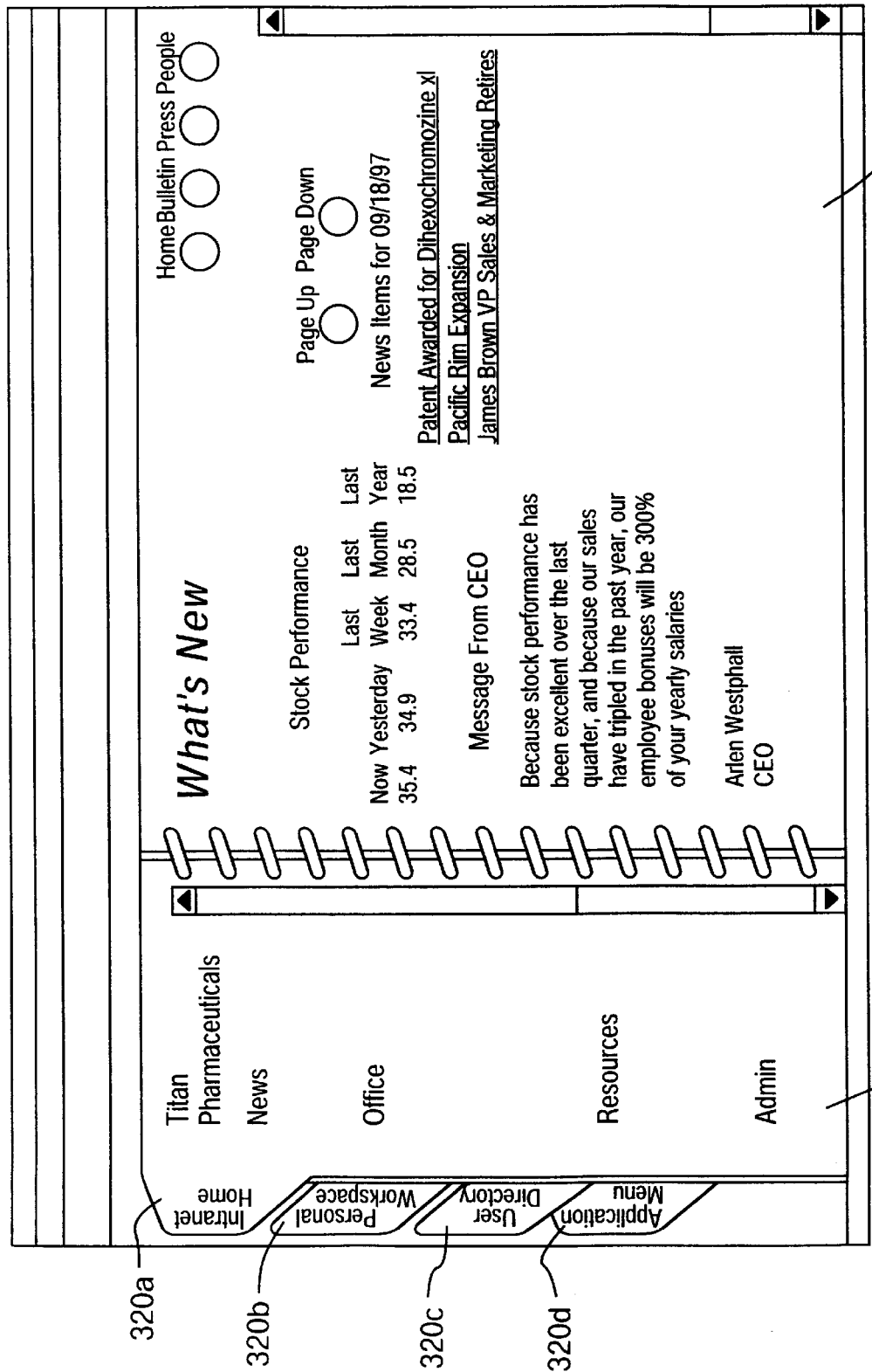
FIGS. 3a–3e are reproductions of user screens from a communication network created in accordance with the present invention.

FIG. 3a shows a system homepage (130) as would be seen by a user upon accessing the system. The system homepage may be used to provide links to general access features such as new, library resources, phone directories, office procedure manuals, etc. From the system homepage, a user can also tab to their own personal workspace (320b).

Figure 3B:
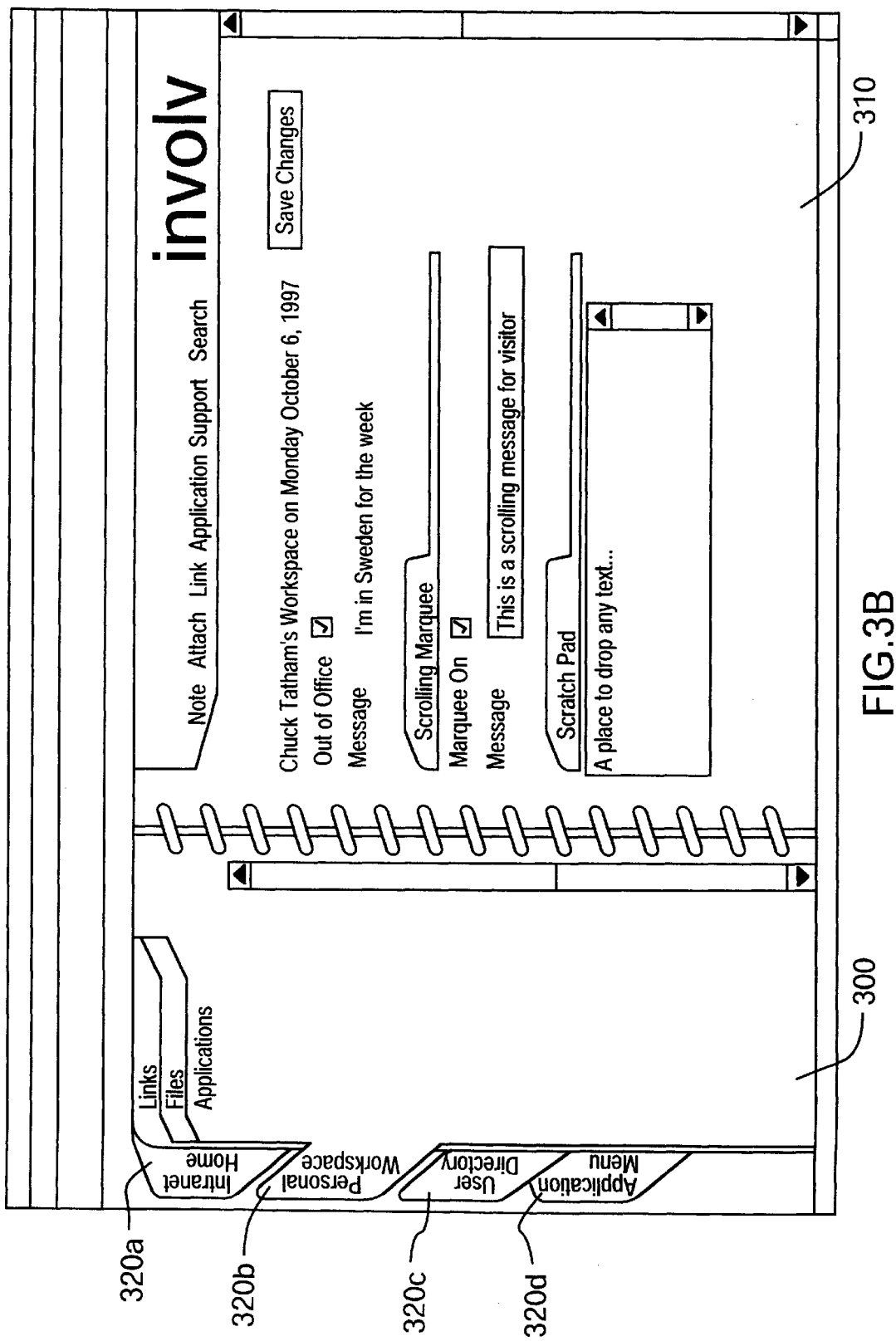

FIG. 3b shows a typical personal workspace as seen by the owner. The index page provides links to the dedicated sites to which the owner has access and also to some generic applications such a personal messaging, chat groups and E-mail.

Figure 3C:
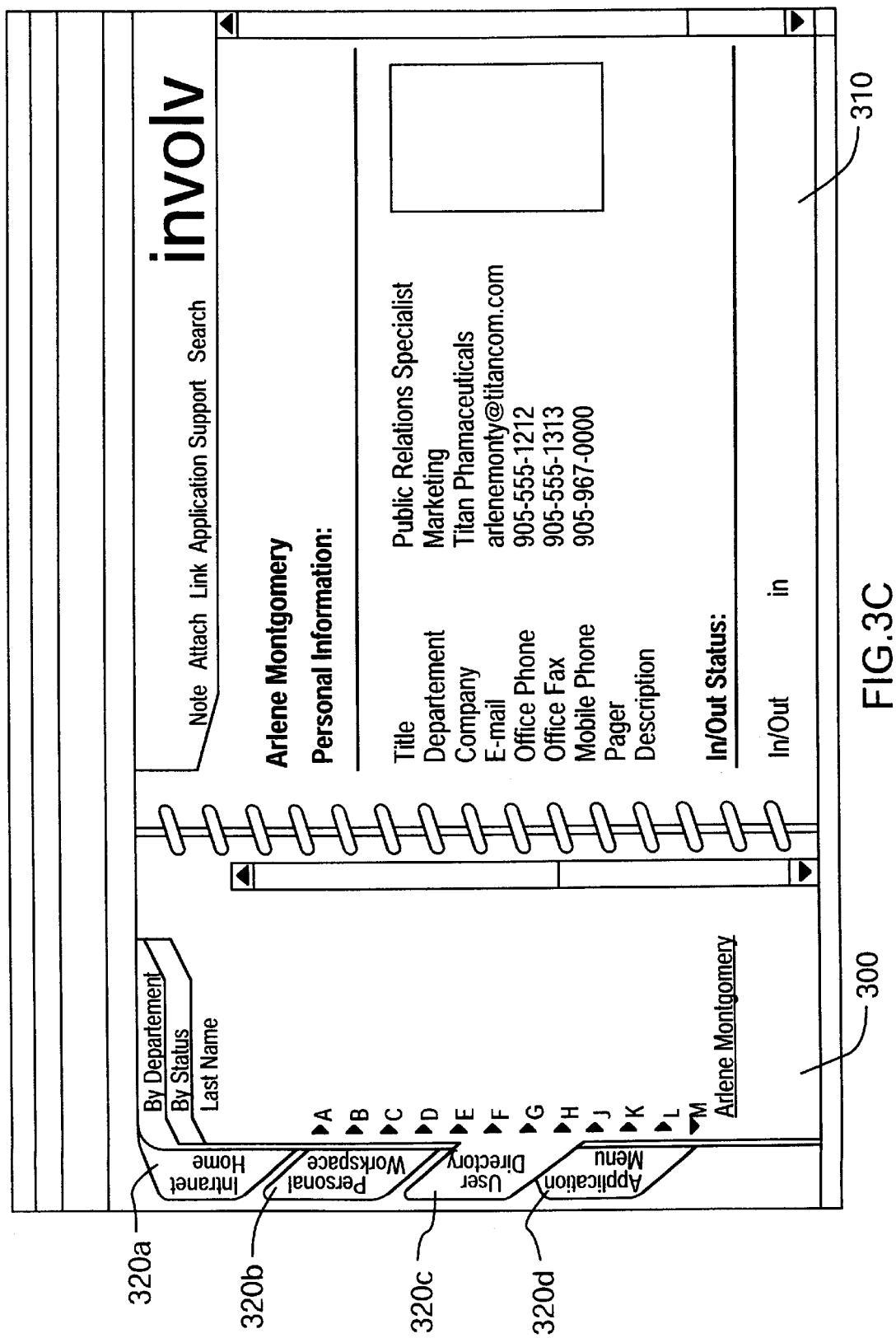

FIG. 3c shows a typical personal workspace as seen by a visitor. This level of a personal workspace may be accessed to any intranet user or authorized external user via the users directory (Tab 320c). In this instance, index page 300 provides links to other users, not to the person's personal dedicated sites. The details page provides information on, for example, contacting the users, the users specialty and the users present availability.

Figure 3D:
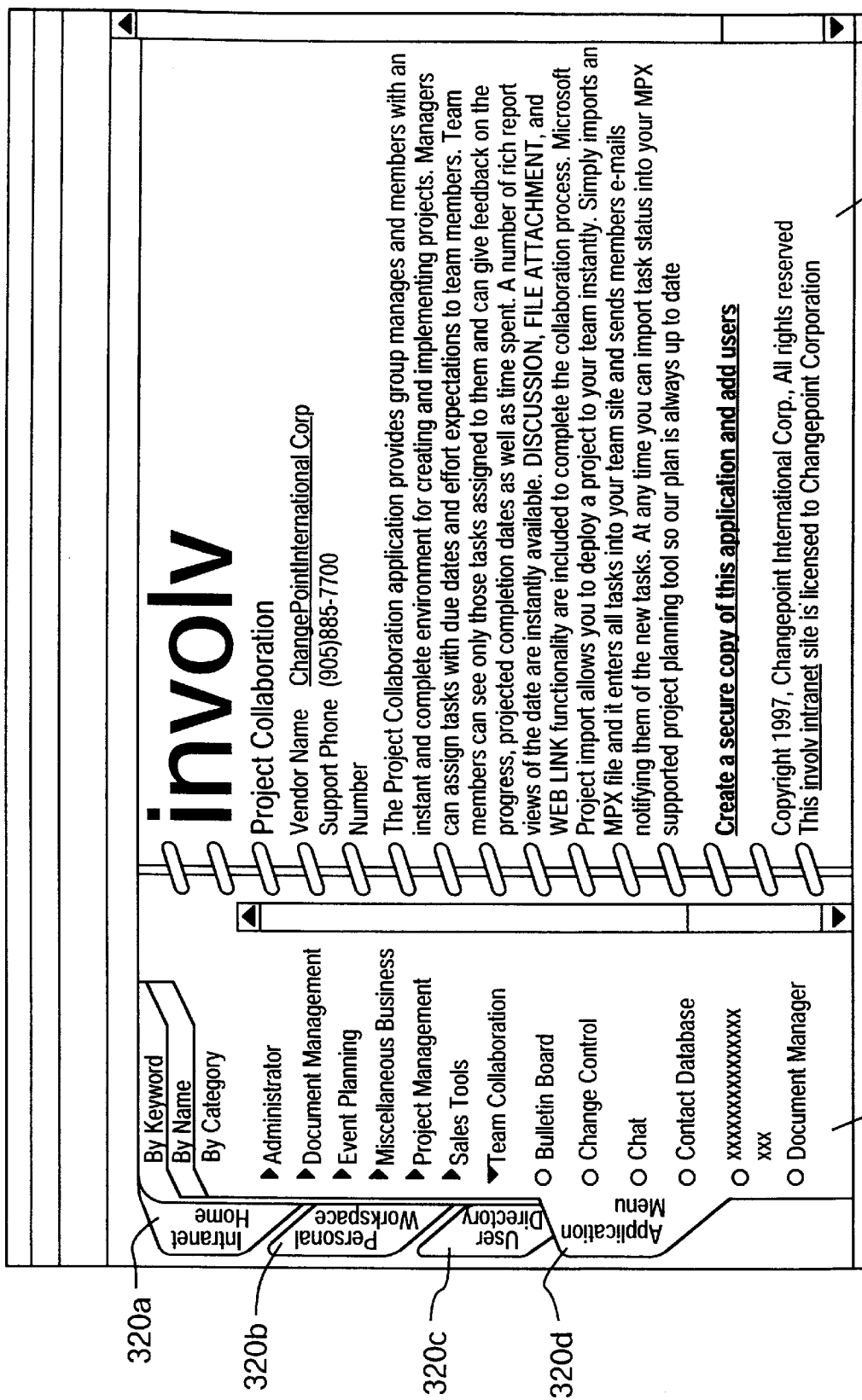

FIG. 3d shows an application menu (Tab 320d) which can be utilized by a user to create dedicated sites and add users to a workgroup. Different styles of sites can be created, depending on the function of the site, e.g., Project Collaboration, Event Planning, Document Managing, etc. The details page can be used to give a user an overview of each type of workgroup and provide a link to a template for creating the group. If a user creates workgroup having a dedicated site, a link to that site is automatically created on the index page 300 of a nominated secondary user's personal workspace (FIG. 3b).

Figure 3E:
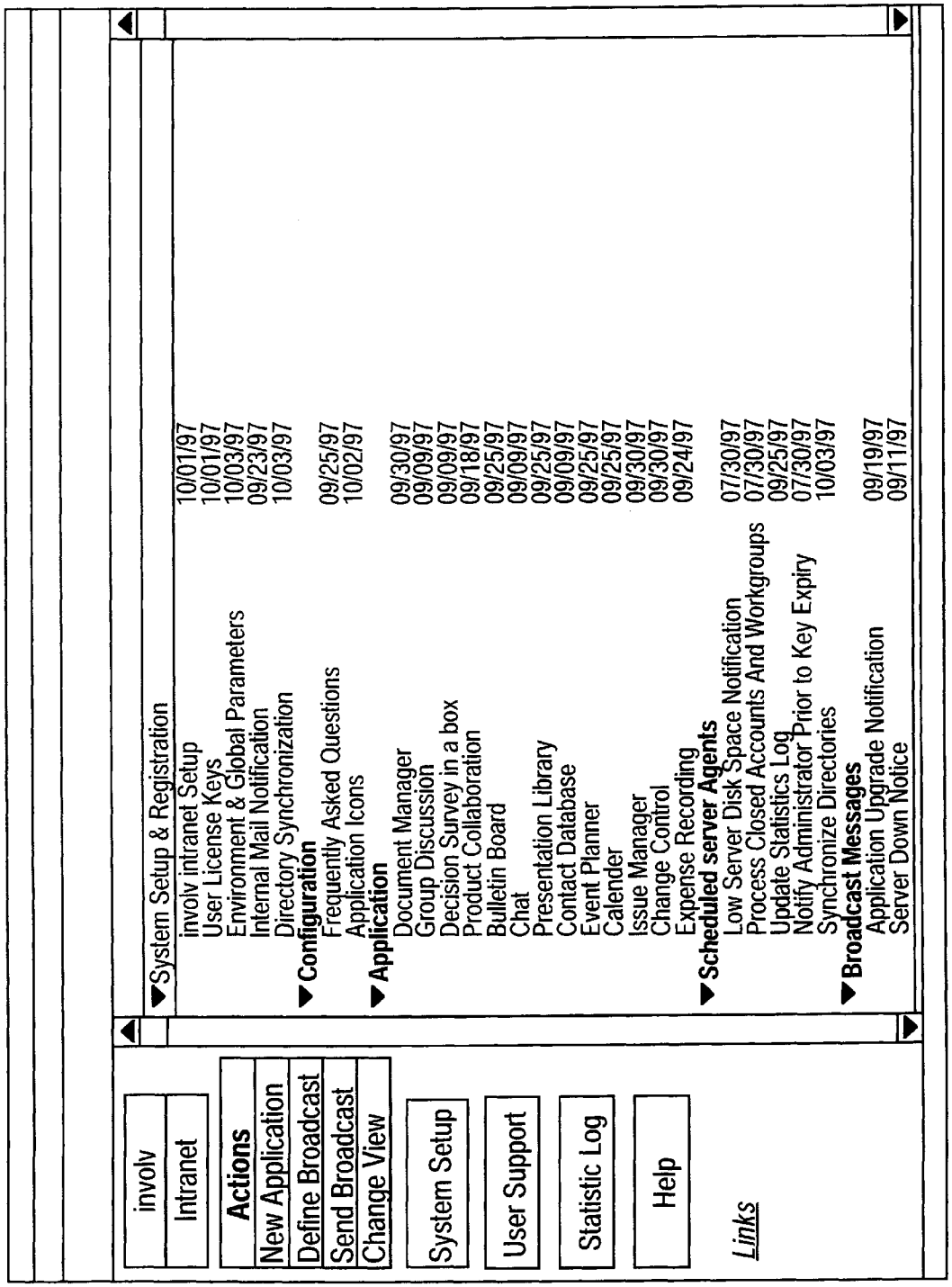

FIG. 3e shows an administration screen which provides a system administrator with access to all aspects of the system.

While the invention has been described in connection with a specific embodiment thereof and in a specific use, various modifications thereof will occur to those skilled in the art without departing from the spirit of the invention as set forth in the appended claims.

The terms and expressions which have been employed in the specification are used as terms of description and not of limitations, there is no intention in the use of such terms and expressions to exclude any equivalents of the features shown and described or portions thereof, but it is recognized that various modifications are possible within the scope of the claims to the invention.

We claim:

1. A system for providing a collaborative workspace, comprising:
   (i) a network-connected server having input and access capabilities;
   (ii) a workgroup creator on the server for receiving instructions from a primary user and for creating a dedicated network site in response to the received instructions, the instructions including a list of secondary users and a working relationship defined between the users;
   (iii) a messaging system for communicating existence of the dedicated network site to a selected ones of the list of secondary users;
   (iv) a network for accessing contents of the dedicated network site by the primary and secondary users via a web-browser; and
   (v) memory associated with the dedicated network site for storing information submitted by the primary and the secondary users, wherein the stored information is accessible to the users in accordance with the predefined working relationship.

2. A system for providing a team of users with network-based groupware application functionality, comprising:
   (i) a network-connected server having an input for receiving an initiate instruction from a primary user, the initiate instruction including a list of secondary users and a working relationship defined between the users;
   (ii) a workgroup creator for creating a dedicated site on the server in response to the initiate instruction received from the primary user;
   (iii) a messaging system for sending information including an address of the dedicated site to selected ones of the list of secondary users nominated by the primary user;
   (iv) a receiver for receiving information at the dedicated site sent by the secondary users using a web-browser;
   (v) memory for storing information at the dedicated site at the request of the primary and the at least one secondary user, wherein the stored information is accessible to the users in accordance with the defined working relationship;
   (vi) a processor for processing the information stored at the dedicated site by the primary and the secondary users; and
   (vii) a transmitter for downloading stored and processed information to the primary user and secondary users for display via a web-browser.

3. The system according to claim 2, wherein the primary user sends the initiate instruction via a web-browser.

4. The system according to claim 1, wherein the receiver comprises a web-browser.

5. The system according to claim 1, wherein the server has a unique URL address.

6. The system according to claim 1, wherein the server contains an address database of communication addresses for users connected to the network.

7. The system according to claim 6, wherein an external user's address can be added to the address database.

8. The system according to claim 1, wherein a user accessing the communication network is assigned a unique personal workspace which provides the user with access to the features of the network assigned to the user.

9. The system according to claim 1, wherein a user is assigned a password enabling access to predefined sites within the server.

10. The system according to claim 1, wherein the processor comprises providing the primary user with a workgroup activity application.

11. The system according to claim 10, wherein the workgroup activity application is selected from the group comprising bulletin board, chat room, calendar, contact database, change control, event planner, group discussion, issue management, project collaboration, presentation library, decision survey in a box, NGS proposal development and document management.

12. The system according to claim 1, wherein the messaging system comprises E-mail.

13. A method for providing a communication network, comprising the steps of:
  (i) providing an network-connected server having upload and download capabilities;
  (ii) receiving instructions uploaded from a primary user and for crating a dedicated network site on the server, the dedicated network site having a unique name in response to the received instructions, the received instructions including a list of secondary users and a working relationship defined between the users;
  (iii) communicating the existence of the dedicated network site to a nominated secondary user;
  (iv) downloading contents of the dedicated network site to the second user via a web-browser installed at the second user;
  (v) storing information in the dedicated web-site uploaded via a web-browser installed at the primary and the second users, wherein the stored information is accessible to the users in accordance with the defined working relationship.

14. A computer configured to operate a groupware application program, the computer comprising:
  (i) a network for connecting the computer to at least a primary and a secondary user;
  (ii) a workgroup creator for receiving instructions input from thee primary user;
  (iii) a site-builder for creating a dedicated site within the computer in response to the instructions received from the primary user, the received instructions including a list of secondary users and a working relationship defined between the users;
  (iv) means to look up address of secondary user from an address database;
  (v) a messaging system for communicating the existence of the dedicated site to the secondary user;
  (vi) memory for storing information at the dedicated site at the request of the primary and the secondary user, wherein the stored information is accessible to the users in accordance with the defined working relationship; and
  (vii) a processor for processing the stored information at the request of the primary and the secondary user.

15. A data carrier having thereon a computer program for facilitating communication between a server, a primary user, and a plurality of secondary users by performing the steps of:
  (i) creating a dedicated site within the server based on instructions received from the primary user, the received instructions including a list of secondary users and a working relationship defined between the users;
  (ii) looking up address of the secondary user from an address database;
  (iii) communicating the existence of the dedicated site to the secondary user;
  (iv) storing information at the dedicated site at the request of the primary and the secondary user, wherein the stored information is accessible to the users in accordance with the defined working relationship;
  (v) processing the stored information at the request of the primary and the secondary user.

* * * * *

UNITED STATES PATENT AND TRADEMARK OFFICE
CERTIFICATE OF CORRECTION

PATENT NO.    : 6,223,177 B1                                             Page 1 of 1
DATED         : April 24, 2001
INVENTOR(S)   : Charles E. Tatham, Randall N. Remme and Gerald W. Smith It is certified that error appears in the above-identified patent and that said Letters Patent is hereby corrected as shown below:

Column 8,
Line 52, replace "claim 1" with -- claim 2 --.

Column 9,
Line 1, replace "claim 1" with -- claim 2 --.
Line 15, replace "an" with -- a --.
Line 18, replace "crating" with -- creating --.
Line 26, replace "second" with -- nominated secondary --.
Line 27, replace "second" with -- nominated secondary --.
Line 29, replace "primary and the" with -- primary and each of the --.
Line 30, replace "second" with -- listed secondary --.
Line 37, replace "secondary" with -- nominated secondary --.
Line 39, replace "thee" with -- the --.

Column 10,
Line 7, replace "secondary" with -- any listed secondary --.
Line 10, replace "secondary" with -- nominated secondary --.
Line 12, replace "secondary" with -- nominated secondary --.
Line 18, replace "secondary" with -- nominated secondary --.
Line 28, replace "the secondary" with -- any of the plurality of secondary --.
Line 31, replace "the secondary" with -- any of the plurality of secondary --.
Line 33, replace "the secondary" with -- any of the plurality of secondary --.
Line 37, replace "the secondary" with -- any of the plurality of secondary --.

Signed and Sealed this

Twenty-third Day of July, 2002

*Attest:*

*Attesting Officer*

JAMES E. ROGAN
*Director of the United States Patent and Trademark Office*